UNITED STATES PATENT OFFICE.

JOHN A. HUNTER, OF PHILADELPHIA, ASSIGNOR, BY DIRECT AND MESNE ASSIGNMENTS, TO THE HUNTER STEEL COMPANY, OF CATASAUQUA, PENNSYLVANIA.

METHOD OF CONVERTING IRON INTO STEEL.

SPECIFICATION forming part of Letters Patent No. 498,062, dated May 23, 1893.

Application filed February 29, 1892. Serial No. 423,284. (No specimens.)

*To all whom it may concern:*

Be it known that I, JOHN A. HUNTER, a citizen of the United States, and a resident of Philadelphia, Pennsylvania, have invented certain Improvements in Converting Iron into Steel, of which the following is a specification.

The object of my invention is to convert cast iron or iron containing a considerable percentage of carbon into steel of good quality, capable of being rolled, hammered, drawn, or tempered, and this object I attain in the manner hereinafter set forth.

The main feature of the invention consists in subjecting the metal while under heat to the action of a gas containing chlorine, oxygen and hydrogen, this gas being generated preferably in the manner hereinafter described.

The metal is treated in the form of castings, bars, or the like, and while heated to redness, or even to a white heat in a closed crucible or retort in which the gas may be generated, or into which said gas may be led from any outside generator.

In practice I have obtained good results by introducing muriatic acid, commercial chloride of lime, or bleaching powder containing hypochlorite and salt into the crucible or retort in which the metal is treated, and then closing the retort and subjecting it to heat, so that the heated iron will be acted upon by the hypochlorous acid (HClO) evolved by the action of the muriatic acid upon the chloride of lime. The chlorine, oxygen and hydrogen gases which constitute the hypochlorous acid are disunited when said acid is brought into contact with the highly heated iron, and the oxygen attacks and removes a certain portion of the carbon in the iron, the hydrogen also assisting in the operation and the action of the gases being facilitated by the presence of the chlorine. The result of the treatment is that metal such as ordinary white iron is converted into a good quality of steel capable of being rolled, drawn, hammered or tempered.

In carrying out my invention, the quantities of the various ingredients in the charge, and the duration of the treatment may vary, depending upon the character of the metal to be treated, and can be best determined by experiment, or by analysis of the metal before treatment. Hence I do not desire to limit myself to specific proportions but I may say that I have in practice, obtained good results by treating white iron with a charge having for every one hundred pounds of metal, about twenty-four ounces of muriatic acid, sixteen ounces of salt, and thirty-two ounces of chloride of lime, the treatment continuing for about two hours after the metal has been brought to a proper heat. The salt may in some cases be omitted, although its use is preferred in most cases, one instance of such preferable use being in the case of iron having a considerable percentage of silicon.

The chemical charge may be heated in a vessel independent of the retort or crucible in which the treatment of the iron takes place so as to generate gas which is conducted into the crucible, but in such case, the gas should not be subjected to any washing, purifying, or refining treatment before it is used.

Having thus described my invention, I claim and desire to secure by Letters Patent—

1. The mode herein described of converting iron into steel, said mode consisting in subjecting the iron, while heated to redness to the action of a gas containing chlorine, oxygen and hydrogen which are disunited by contact with the heated iron, substantially as specified.

2. The mode herein described of converting iron into steel, said mode consisting in subjecting the iron, while heated to redness in a crucible or retort, to the action of the gas evolved from a mixture of muriatic acid and chloride of lime under heat, substantially as specified.

3. The mode herein described of converting iron into steel, said mode consisting in subjecting the iron, while heated to redness in a crucible or retort, to the action of the gas evolved from a mixture of muriatic acid, chloride of lime, and salt, under heat, substantially as specified.

In testimony whereof I have signed my name to this specification in the presence of two subscribing witnesses.

JNO. A. HUNTER.

Witnesses:
EUGENE ELTERICH,
HARRY SMITH.